(12) United States Patent
Weston et al.

(10) Patent No.: US 12,358,567 B2
(45) Date of Patent: Jul. 15, 2025

(54) INTEGRATED SKID PLATE HEAT DISSIPATOR

(71) Applicant: Ford Global Technologies, LLC, Dearborn, MI (US)

(72) Inventors: Keith Weston, Canton, MI (US); Jim Stevens, Belleville, MI (US); David D. Friske, Wolverine Lake, MI (US); Mark Meinhart, Dexter, MI (US); Matthew Arthur Titus, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 279 days.

(21) Appl. No.: 17/969,355

(22) Filed: Oct. 19, 2022

(65) Prior Publication Data

US 2024/0132160 A1  Apr. 25, 2024
US 2024/0227946 A9  Jul. 11, 2024

(51) Int. Cl.
*B62D 25/20* (2006.01)
*B60K 1/04* (2019.01)
(Continued)

(52) U.S. Cl.
CPC ............ *B62D 25/2072* (2013.01); *B60K 1/04* (2013.01); *B60K 11/06* (2013.01); *B60L 58/26* (2019.02);
(Continued)

(58) Field of Classification Search
CPC ............... B60H 1/00278; B60H 1/143; B60H 1/00885; B60H 1/32; B60H 1/00564; B60H 1/3229; B60H 1/246; B60H 2001/3277; B60H 1/242; B60H 2001/3286; B60H 1/00557; B62D 25/2072; B62D 21/15; B62D 29/04; B62D 35/02; B60K 1/04; B60K 11/06; B60K 2001/0438; B60K 2001/005; B60L 58/26; H01M 10/613;
(Continued)

(56) References Cited

U.S. PATENT DOCUMENTS 10,308,132 B2 * 6/2019 Milton ...................... B60L 1/00
10,611,234 B1 * 4/2020 Berels ................. H01M 10/656
(Continued)

FOREIGN PATENT DOCUMENTS

DE  102015108611 A1 * 12/2016 ............. B60L 58/26
DE  102022126070 A1 * 6/2023 ............. B60K 1/04
(Continued)

OTHER PUBLICATIONS

DE-102015108611-A1 English Translation (Year: 2016).*
(Continued)

*Primary Examiner* — James A Shriver, II
*Assistant Examiner* — Michael T. Walsh
(74) *Attorney, Agent, or Firm* — Burris Law, PLLC

(57) ABSTRACT

A component for a vehicle includes a skid plate configured to attach to an underbody of the vehicle, a plurality of cooling channels extending in a longitudinal direction between the skid plate and the underbody of the vehicle, and a structural reinforcement extending outward from the skid plate. The skid plate, the plurality of cooling channels, and the structural reinforcement are additively manufactured in a unitary construction.

20 Claims, 5 Drawing Sheets

(51) Int. Cl.
 B60K 11/06 (2006.01)
 B60L 58/26 (2019.01)
 B62D 21/15 (2006.01)
(52) U.S. Cl.
 CPC ...... B62D 21/15 (2013.01); *B60K 2001/0438* (2013.01)
(58) Field of Classification Search
 CPC ........... H01M 10/625; H01M 10/6561; H01M 2220/20
 See application file for complete search history.

(56) References Cited

U.S. PATENT DOCUMENTS

| | | | |
|---|---|---|---|
| 11,084,386 B2 * | 8/2021 | Howard | B60K 1/04 |
| 11,124,076 B1 * | 9/2021 | Borghi | B62D 21/02 |
| 11,602,985 B2 | 3/2023 | Weston et al. | |
| 2010/0025131 A1 * | 2/2010 | Gloceri | B60K 6/52 |
| | | | 180/65.265 |
| 2023/0369699 A1 * | 11/2023 | Yu | B60L 50/64 |
| 2024/0213606 A1 * | 6/2024 | Negishi | B60K 1/04 |

FOREIGN PATENT DOCUMENTS

| | | | | |
|---|---|---|---|---|
| DE | 102022124584 A1 * | 3/2024 | | |
| EP | 4160000 A1 * | 4/2023 | ......... | F02B 29/0412 |
| ES | 2927836 T3 * | 11/2022 | ............... | B60K 1/04 |
| KR | 20240039415 A * | 3/2024 | | |
| NL | 1043124 B1 * | 8/2020 | | |
| WO | WO-2022101221 A1 * | 5/2022 | ............... | B60K 1/04 |
| WO | WO-2022143064 A1 * | 7/2022 | | |

OTHER PUBLICATIONS

KR-20240039415-A English Translation (Year: 2024).*
WO-2022101221-A1 English Translation (Year: 2022).*
ES-2927836-T3 English Translation (Year: 2022).*
WO-2022143064-A1 English Translation (Year: 2022).*
DE-102022126070-A1 English Translation (Year: 2023).*
DE-102022124584-A1 English Translation (Year: 2024).*

* cited by examiner

INTEGRATED SKID PLATE HEAT DISSIPATOR

FIELD

The present disclosure relates to thermal control of vehicle components.

BACKGROUND

The statements in this section merely provide background information related to the present disclosure and may not constitute prior art.

Thermal control of vehicle components improves operation of those components. As one example, vehicle batteries have optimal performance in specific temperature ranges, and when temperatures of the vehicle batteries exceed those temperature ranges, the electrical charge capacity of the vehicle batteries may be reduced. Controlling the temperature of the vehicle batteries to within the specific temperature ranges with a heat transfer device, such as a heat exchanger, can increase the lifetime of the vehicle batteries. Conventional heat exchangers use internal working fluids, which can increase weight and use additional parts that are added to the vehicle.

The present disclosure addresses the challenges of thermal control of vehicle components.

SUMMARY

This section provides a general summary of the disclosure and is not a comprehensive disclosure of its full scope or all of its features.

In one form, a component for a vehicle includes a skid plate configured to attach to an underbody of the vehicle and a plurality of cooling channels extending in a longitudinal direction between the skid plate and the underbody of the vehicle, the plurality of cooling channels in thermal communication with a heat-emitting vehicle component. The skid plate and the plurality of cooling channels are additively manufactured in a unitary construction. The plurality of cooling channels are configured to receive air flowing external to the vehicle.

In variations of the component, which may be implemented individually or in combination: gyroid structures are disposed in each of the plurality of cooling channels; the gyroid structures are additively manufactured in the plurality of cooling channels; the skid plate defines a plurality of inlet vents configured to direct the air flowing external to the vehicle during operation of the vehicle into the plurality of cooling channels; the heat-emitting vehicle component is a battery, the plurality of cooling channels are disposed beneath the battery disposed on the underbody; the skid plate defines at least one inlet vent and at least one outlet vent that are disposed longitudinally to direct the air external to the vehicle through the cooling channels to dissipate heat from the battery; the cooling channels define a lower surface of a battery enclosure housing the battery, and the battery enclosure defines at least a portion of the underbody of the vehicle; the underbody includes a pair of opposed frame rails, and the skid plate is attached to the opposed frame rails; a structural reinforcement extends outward from the skid plate; the structural reinforcement further includes a deformable impact energy absorber; the structural reinforcement is additively manufactured in the unitary construction with the cooling channels and the skid plate; the skid plate is formed of a thermally conductive material in thermal communication with the plurality of cooling channels; the heat-emitting vehicle component is a powertrain component, wherein the powertrain component is in thermal communication with the plurality of cooling channels.

In another form, a component for a vehicle includes a skid plate, a cooling channel disposed above the skid plate, the cooling channel including an air inlet and an air outlet, the air inlet longitudinally forward of the air outlet, and a structural reinforcement disposed below the skid plate, the structural reinforcement including a deformable impact energy absorber. The skid plate, the cooling channel, and the structural reinforcement are additively manufactured in a unitary construction.

In variations of the component, which may be implemented individually or in combination: a battery is in thermal communication with the cooling channel; the cooling channel includes a gyroid structure.

In another form, an additively manufactured heat dissipator for dissipating heat from a vehicle component includes a skid plate and a plurality of cooling channels disposed on an upper surface of the skid plate and configured to receive air external to a vehicle, each cooling channel including a gyroid structure. The skid plate and the plurality of cooling channels are additively manufactured in a unitary construction.

In variations of the heat dissipator, which may be implemented individually or in combination: the skid plate is attached to a pair of frame rails disposed along an underbody of the vehicle; the vehicle component is one of a vehicle battery and a powertrain component; the skid plate defines a plurality of inlet vents configured to provide the air external to the vehicle to the cooling channels and a plurality of outlet vents configured to expel air from the cooling channels.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
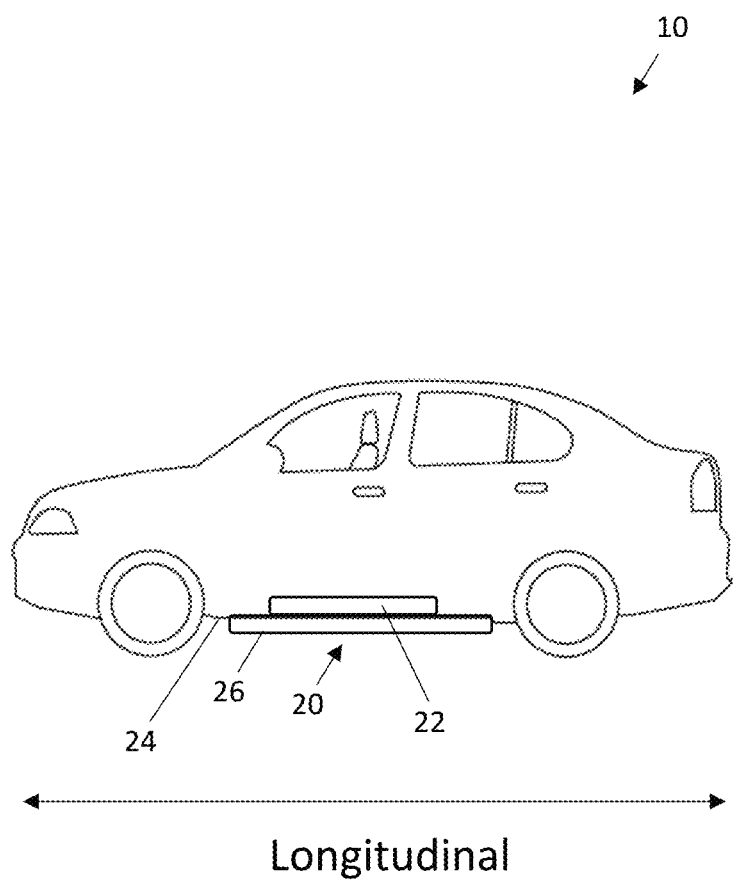
FIG. 1 is a side view of a vehicle including a heat dissipator according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, a vehicle 10 includes a heat dissipator 20 that dissipates heat from another vehicle component 22. The heat dissipator 20 is disposed on an underbody 24 of the vehicle 10 such the heat dissipator 20 includes a skid plate 26 and such that air moving in a longitudinal direction under the vehicle 10 cools the vehicle component 22 via the heat dissipator 20. The vehicle component 22 is a component that generates heat, such as a battery or a powertrain, and the heat dissipator 20 dissipates the heat to an environment external to the vehicle 10 to improve operation of the vehicle component 22.

Figure 2:
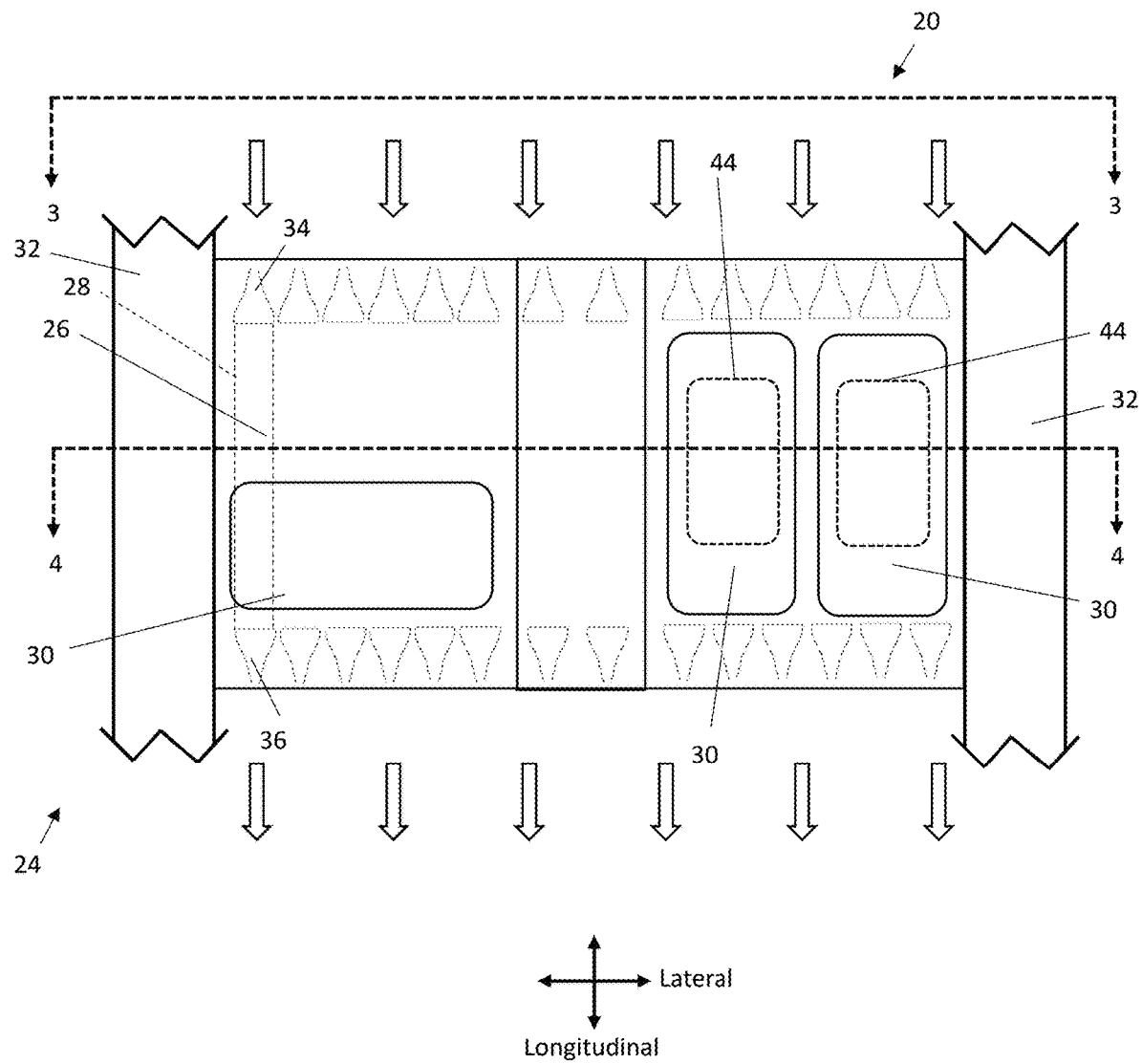
FIG. 2 is a bottom-up view of the heat dissipator of FIG. 1 according to the present disclosure.
Figure 3:
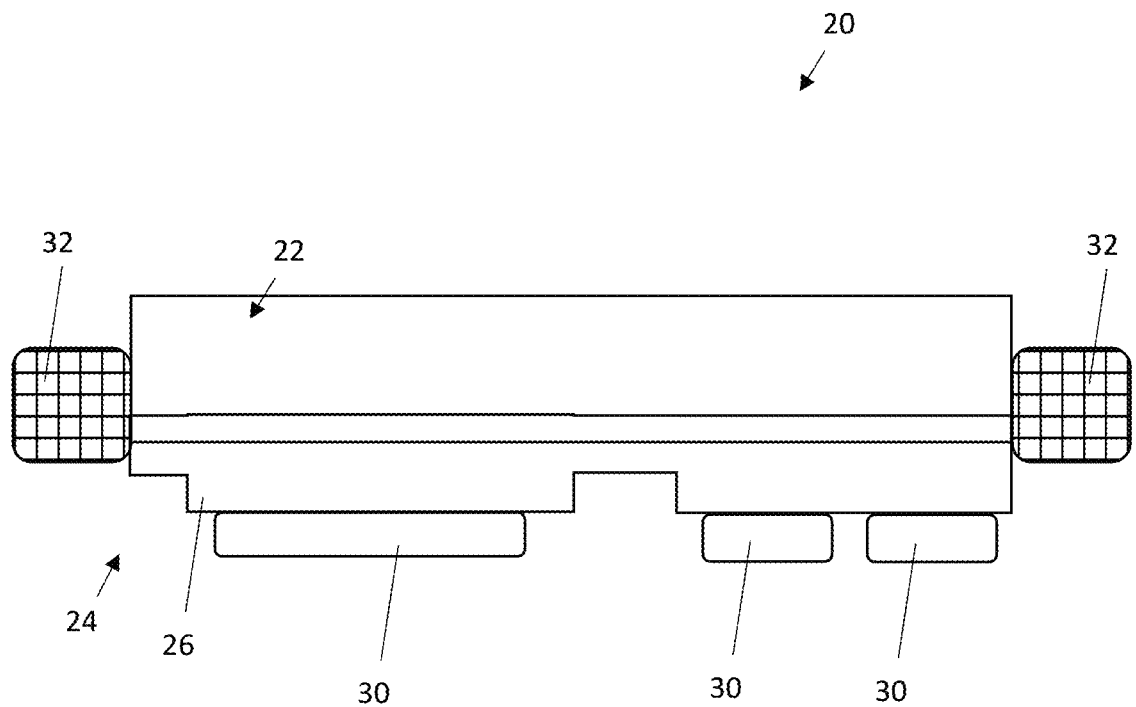
FIG. 3 is a front view of the heat dissipator of FIG. 1 along the line 3-3 shown in FIG. 2 according to the present disclosure.
Figure 4:
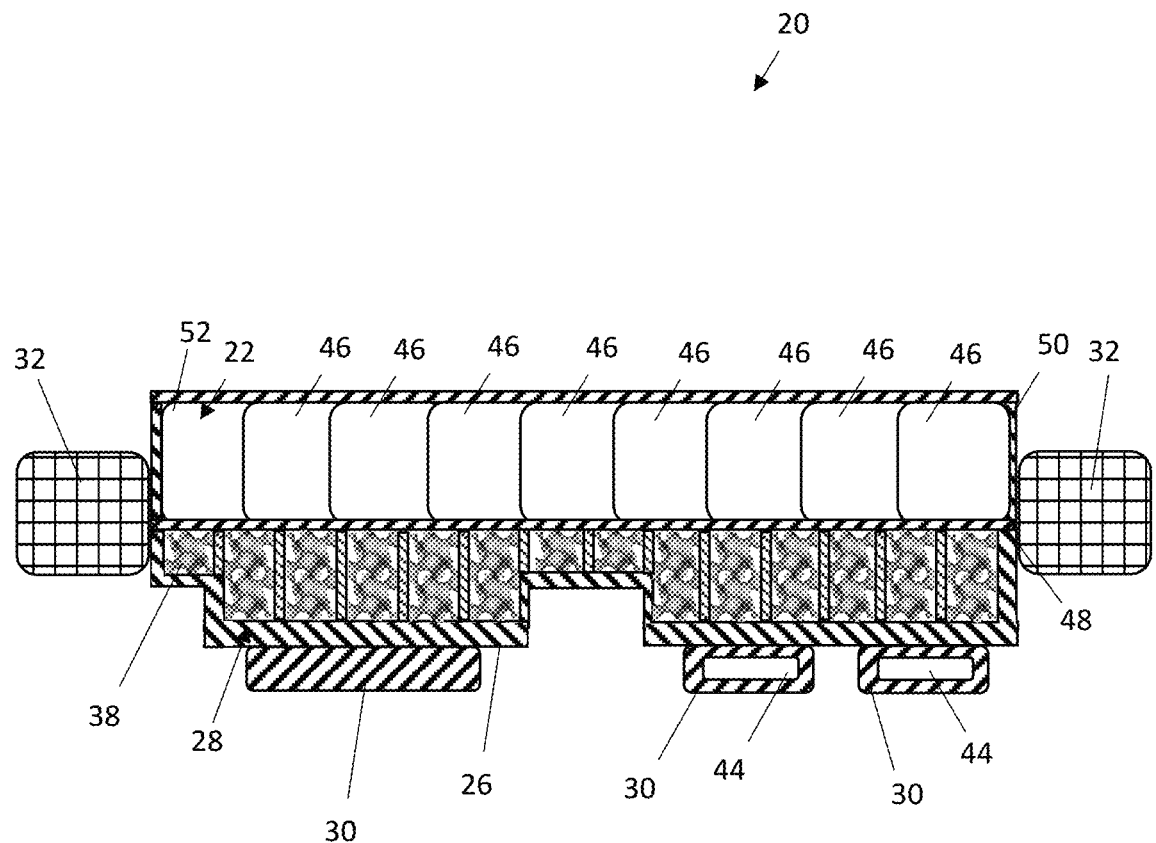
FIG. 4 is a cross-sectional view of the heat dissipator of FIG. 1 along the line 4-4 shown in FIG. 2 according to the present disclosure.

With reference to FIGS. 2-5, one form of the heat dissipator 20 used in the vehicle of FIG. 1 is shown. The heat dissipator 20 includes the skid plate 26, a plurality of cooling channels 28 (shown in FIG. 4 and one of which is shown in dashed lines in FIG. 2) and one or more structural reinforcements 30. The skid plate 26 is attached to a pair of frame rails 32 of the vehicle 10, opposed in a lateral direction of the underbody 24. The skid plate 26 is exposed to air external to the vehicle 10, cooling the vehicle component 22 by conducting heat to air beneath the vehicle 10 and protecting the underbody 24 from impacts from road debris. The skid plate 26 is formed of a thermally conductive material, such as steel or aluminum. In the form of FIGS. 2-4, the skid plate 26 is recessed upward in a laterally interior portion and extends out (i.e., downward) on outer lateral portions. The recessed interior portion reduces drag from air flow caused by the skid plate 26. In another form not shown in the figures, the skid plate 26 is substantially flat in the lateral direction between the frame rails 32.

The cooling channels 28 extend in a longitudinal direction along the underbody 24 from inlet vents 34 formed in the skid plate 26 to outlet vents 36 formed in the skid plate 26. The inlet vents 34 are longitudinally forward of the outlet vents 36 and provide air to an inlet of the cooling channels 28. The outlet vents 36 expel air from an outlet of the cooling channels 28 in a longitudinally rearward direction. In the form of FIG. 2, the vents 34, 36 are low-drag recessed vents commonly known as "NACA" (National Advisory Committee for Aeronautics) ducts. The NACA ducts are defined in the skid plate 26 such that they are recessed from the front view shown in FIG. 3 (i.e., recessed upward from a bottom surface of the skid plate 26), and visible from the bottom view of FIG. 2. Using NACA ducts as the vents 34, 36 provides air flow into the cooling channels 28 while reducing drag on the vehicle 10. In another form not shown in the figures, the inlet vents 34 and/or the outlet vents 36 can have different shapes. For example, the inlet vents 34 and/or the outlet vents 36 may protrude outward (i.e., downward) from the surrounding bottom surface of the skid plate 26 to receive air flowing beneath the vehicle 10. The cooling channels 28 may also optionally protrude outward (i.e., downward) from the surrounding bottom surface of the skid plate 26 to receive air flowing beneath the vehicle 10 from the inlet vents 34.

Figure 5:
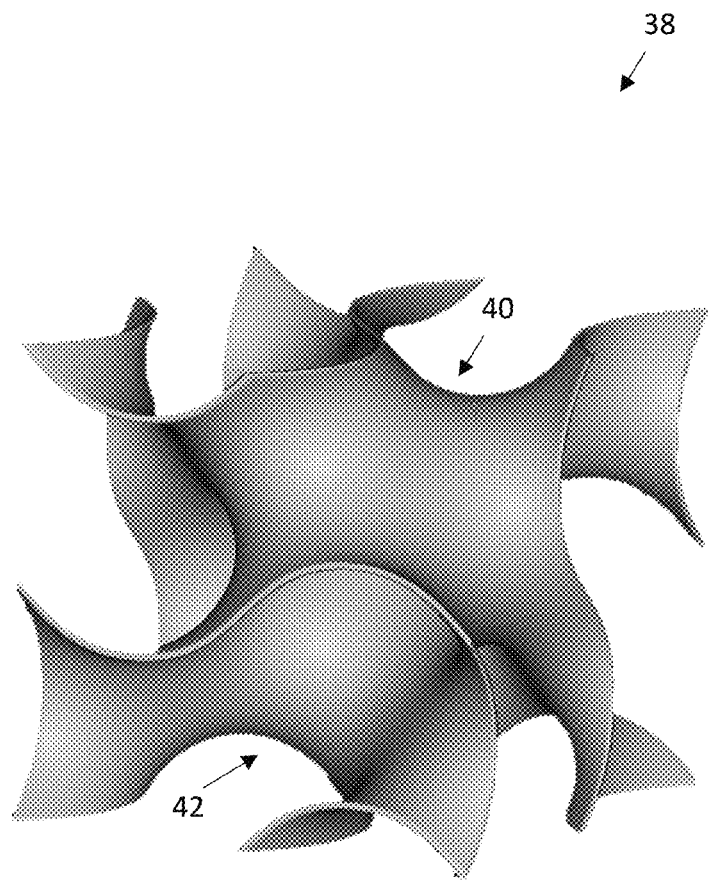
FIG. 5 is an enlarged view of a gyroid structure of the heat dissipator of FIG. 1 according to the present disclosure.

The cooling channels 28 may optionally include a plurality of gyroid structures 38. In this context, a "gyroid" structure is a structure formed in a gyroid shape, i.e., a triply periodic minimal geometric surface delimiting one or more passages. The gyroid structure 38 is additively manufactured to specific geometries in order to delimit the congruent passages. In this form, as shown in FIG. 5, two passages 40, 42 are delimited by the gyroid structure 38 that have increased surface area compared to a conventional tube, increasing heat transfer from the component 22 to the air flowing through the cooling channels 28 by increasing contact between the air flowing through the passages 40, 42 and the component 22 emitting heat. The specific geometries of the gyroid structures 38 may increase turbulence in the air flowing through the passages 40, 42, further improving heat transfer from the component 22. In another form not shown in the figures, the gyroid structure 38 defines a single passage through which air flows to absorb heat from the component 22. The gyroid structures 38 thus provide at least some of the heat dissipating function of the heat dissipator 20, transferring heat from the component 22 to the environment external to the vehicle.

In an alternative form, not specifically shown, the gyroid structures 38 can be replaced by other heat transfer structures configured to increase surface area in contact with the air flowing through the cooling channels 28, such as fins for example.

Returning to the example shown, in addition to the heat expelled by the air flowing through the gyroid structures 38, the cooling channels 28 transfer heat from the component 22 to the skid plate 26 to cool the component. That is, the skid plate 26 is formed of a thermally conductive material as described above, and the cooling channels 28 increase the temperature of the skid plate 26 by contact between the air heated. In addition, the component 22 can conduct heat directly to the skid plate 26, such as via the walls of the channels 28 and/or the gyroid structures 38 for example. The heated skid plate 26 transfers its heat to the cooler air beneath the underbody 24 flowing along the skid plate 26 and away from the vehicle 10. The convective cooling of the skid plate 26 by the air flowing beneath the underbody 24 further reduces the temperature of the vehicle component 22. The skid plate 26 may also radiate heat away from the vehicle 10, such as to the ground (not shown).

In one form, the heat dissipator 20 includes one or more structural reinforcements 30 extending outward (i.e., downward) from the skid plate 26 and disposed between the frame rails 32. The structural reinforcements 30 are structures that provide impact resistance to the heat dissipator 20, absorbing energy during an impact to inhibit deformation of the component 22, the cooling channels 28, and the skid plate 26. In one form, the structural reinforcements 30 are hollow metal shells disposed on the skid plate 26 that absorb energy during an impact. In another form, the structural reinforcement 30 further includes a deformable impact energy absorber 44, such as a foam insert, that absorbs energy during the impact. The structural reinforcements 30 are disposed on the skid plate 26 at specified locations to provide impact resistance to specific parts of the component 22, as determined by conventional impact testing protocols and/or impact modeling. By including the structural reinforcement 30, the heat dissipator 20 both provides heat transfer from the component 22 and inhibits deformation of the component 22 during an impact.

In one form, the skid plate 26, the cooling channels 28, and the structural reinforcements 30 of the heat dissipator 20 are additively manufactured in a unitary construction, such as by metal jet binding or filament deposition. Specifically, the specific geometries of the gyroid structures 38 may be difficult to manufacture in a method other than additively manufacturing and constructing the heat dissipator as a unitary construction provides these geometries. The unitary construction improves heat transfer with the gyroid structures 38 and improves mechanical strength by reducing or eliminating disconnected regions that may deform more readily during an impact. Further, the additive manufacturing process allows for specific geometries of the inlet vents 34 and the outlet vents 36, such as the NACA ducts described above, to reduce drag caused by the skid plate 26.

In the form of FIGS. 1 and 4, the vehicle component 22 is a vehicle battery. The battery includes a plurality of battery cells 46 disposed above the cooling channels 28. A lower surface 48 of a battery enclosure 50, housing the battery cells 46, defines an upper wall of the cooling channels 28 such that the cooling channels 28 are in thermal communication with the battery. That is, the heat from the battery cells 46 is transferred by conduction to the cooling channels 28 beneath, and an upper surface 52 of the battery enclosure may be attached to another portion of the vehicle 10, such as a floor pan (not shown) of the vehicle 10. The battery cells 46 generate heat that is transferred to the air flowing through the cooling channels 28, dissipating heat from the battery cells 46. In another form, not shown in the figures, the vehicle component 22 includes a powertrain component that generates heat, and the cooling channels 28 are configured to dissipate heat from the powertrain component. In one form, that powertrain component (not shown) can be in direct contact with the heat dissipator 20. In another form, that powertrain component may transfer heat to the heat dissipator 20 via cooling lines for example.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A component for a vehicle, the component comprising:
   a skid plate configured to attach to an underbody of the vehicle; and
   a plurality of cooling channels extending in a longitudinal direction between the skid plate and the underbody of the vehicle and extending from a front end of the skid plate to a rear end of the skid plate, the plurality of cooling channels in thermal communication with a heat-emitting vehicle component,
   wherein the skid plate and the plurality of cooling channels are additively manufactured in a unitary construction,
   wherein the plurality of cooling channels are configured to receive air flowing external to the vehicle.

2. The component of claim 1, further comprising gyroid structures disposed in each of the plurality of cooling channels, the gyroid structures each defining a plurality of air flow passages within each of the cooling channels.

3. The component of claim 2, wherein the gyroid structures are additively manufactured in the plurality of cooling channels.

4. The component of claim 1, wherein the skid plate defines a plurality of inlet vents configured to direct the air flowing external to the vehicle during operation of the vehicle into the plurality of cooling channels.

5. The component of claim 1, wherein the heat-emitting vehicle component is a battery, wherein the plurality of cooling channels are disposed beneath the battery disposed on the underbody.

6. The component of claim 5, wherein the skid plate defines at least one inlet vent and at least one outlet vent that are disposed longitudinally to direct the air external to the vehicle through the cooling channels to dissipate heat from the battery.

7. The component of claim 6, wherein the cooling channels define a lower surface of a battery enclosure housing the battery, and the battery enclosure defines at least a portion of the underbody of the vehicle.

8. The component of claim 1, wherein the underbody includes a pair of opposed frame rails, and the skid plate is attached to the opposed frame rails.

9. The component of claim 1, further comprising a structural reinforcement extending outward from the skid plate.

10. The component of claim 9, wherein the structural reinforcement further includes a deformable impact energy absorber.

11. The component of claim 9, wherein the structural reinforcement is additively manufactured in the unitary construction with the cooling channels and the skid plate.

12. The component of claim 1, wherein the skid plate is formed of a thermally conductive material in thermal communication with the plurality of cooling channels.

13. The component of claim 1, wherein the heat-emitting vehicle component is a powertrain component, wherein the powertrain component is in thermal communication with the plurality of cooling channels.

14. A component for a vehicle, the component comprising:
    a skid plate;
    a cooling channel disposed above the skid plate, the cooling channel including an air inlet and an air outlet, the air inlet longitudinally forward of the air outlet, the air inlet being disposed at a front end of the skid plate, the air outlet being disposed at a rear end of the skid plate; and
    a structural reinforcement disposed below the skid plate, the structural reinforcement including a deformable impact energy absorber,
    wherein the skid plate, the cooling channel, and the structural reinforcement are additively manufactured in a unitary construction.

15. The component of claim 14, further comprising a battery in thermal communication with the cooling channel.

16. The component of claim 14, wherein the cooling channel includes a gyroid structure, the gyroid structure defining a plurality of air passages within the cooling channel.

17. An additively manufactured heat dissipator for dissipating heat from a vehicle component, the additively manufactured heat dissipator comprising:
    a skid plate; and
    a plurality of cooling channels disposed on an upper surface of the skid plate and configured to receive air external to a vehicle, each cooling channel including a gyroid structure defining a plurality of air passages within each of the plurality of cooling channels,
    wherein the skid plate and the plurality of cooling channels are additively manufactured in a unitary construction.

18. The additively manufactured heat dissipator of claim 17, wherein the skid plate is attached to a pair of frame rails disposed along an underbody of the vehicle.

19. The additively manufactured heat dissipator of claim 17, wherein the vehicle component is one of a vehicle battery and a powertrain component.

20. The additively manufactured heat dissipator of claim 17, wherein the skid plate defines a plurality of inlet vents configured to provide the air external to the vehicle to the cooling channels and a plurality of outlet vents configured to expel air from the cooling channels.

* * * * *